US012781135B2

(12) United States Patent
Iyyamperumal et al.

(10) Patent No.: US 12,781,135 B2

(45) Date of Patent: Nov. 3, 2026

(54) FCC CATALYST WITH ULTRASTABLE ZEOLITE AND TRANSITIONAL ALUMINA ITS PREPARATION AND USE

(71) Applicant: Albemarle Corporation, Charlotte, NC (US)

(72) Inventors: Eswaramoorthi Iyyamperumal, Houston, TX (US); Edward Lee Foster, Pearland, TX (US); Maria Margaret Ludvig, El Lago, TX (US)

(73) Assignee: Albemarle Corporation, Charlotte, NC (US)

(*) Notice: Subject to any disclaimer, the term of this patent is extended or adjusted under 35 U.S.C. 154(b) by 6 days.

(21) Appl. No.: 18/569,759

(22) PCT Filed: Jun. 29, 2022

(86) PCT No.: PCT/US2022/035528

§ 371 (c)(1),
(2) Date: Dec. 13, 2023

(87) PCT Pub. No.: WO2023/278581

PCT Pub. Date: Jan. 5, 2023

(65) Prior Publication Data

US 2024/0384182 A1 Nov. 21, 2024

Related U.S. Application Data

(60) Provisional application No. 63/217,050, filed on Jun. 30, 2021.

(51) Int. Cl.
*C10G 11/18* (2006.01)
*B01J 29/08* (2006.01)
(Continued)

(52) U.S. Cl.
CPC ............. *C10G 11/18* (2013.01); *B01J 29/084* (2013.01); *B01J 29/088* (2013.01); *B01J 35/38* (2024.01);
(Continued)

(58) Field of Classification Search
CPC ............ C10G 11/18; C10G 2300/1003; C10G 2300/1014; C10G 2300/1007;
(Continued)

(56) References Cited

U.S. PATENT DOCUMENTS 4,086,187 A 4/1978 Lim et al.
4,206,085 A 6/1980 Lim et al.
(Continued)

FOREIGN PATENT DOCUMENTS

CN 1247885 A 3/2002
CN 101147875 A 9/2009
(Continued)

OTHER PUBLICATIONS

PCT/US2022/035528 International Search Report and Written Opinion of the International Searching Authority, Date Mailed Sep. 27, 2022.

(Continued)

*Primary Examiner* — Prem C Singh
*Assistant Examiner* — Francis C Campanell

(57) ABSTRACT

Process for the preparation of a catalyst and a catalyst comprising the use of chi or gamma or gibbsite alumina. Thus, in one embodiment, the invention provides an FCC catalyst composition comprising of ultra-stabilize Y zeolite (USY zeolite) with total Lewis acidity retention of at least above 15% when increasing the adsorption temperature from 200 to 400° C. in pyridine adsorbed FT-IR and at least above 35% retention in total acidity when increasing the desorption temperature from 300 to 400° C. in ammonia
(Continued)

| Zeolite Type | UCS (Å) | Acidity @200°C mmol/g | | Acidity @400°C mmol/g | | Lewis Acidity Retention, % |
|---|---|---|---|---|---|---|
| | | Bronsted Acidity (mmol/g) | Lewis Acidity (mmol/g) | Bronsted Acidity (mmol/g) | Lewis Acidity (mmol/g) | |
| RE-Y-1 | 24.68 | 43.86 | 10.24 | 34.74 | 0.50 | 5% |
| RE-USY-1 | 24.57 | 38.20 | 5.17 | 27.04 | 1.08 | 21% |
| RE-USY-2 | 24.52 | 38.80 | 6.19 | 29.03 | 1.04 | 17% |
| RE-Y-2 | 24.68 | 49.33 | 10.04 | 32.2 | 1.13 | 11% |
| RE-USY-3 | 24.52 | 39.10 | 10.27 | 28.07 | 2.26 | 22% |
| RE-Y-3 | 24.68 | 42.76 | 11.24 | 22.94 | 0.58 | 5% |
| RE-USY-4 | 24.63 | 38.54 | 10.05 | 27.68 | 3.75 | 37% |
| RE-USY-5 | 24.57 | 47.29 | 7.54 | 36.26 | 1.94 | 26% |

TPD measurement and at least two different alumina types wherein at least one alumina is a dispersible binding alumina sol and the other alumina is of a transitional alumina phase with XRD peaks at about 37.6 (311), 45.8 (400) and 67 (440) 2-theta (referred herein as gamma alumina) or metastable phase alumina with characteristics XRD peaks of 2θ values of 37, 43, and 67 degrees (referred herein as chi alumina) or non-peptizable gibbsite-alumina has the characteristics XRD peaks of 2θ values of 18, 20.3 and 38 degrees (referred herein as gibbsite alumina). Further, the total amount of chi or gamma or gibbsite alumina is greater than 0 wt % to about 20-30 wt %.

15 Claims, 2 Drawing Sheets

(51) Int. Cl.
*B01J 35/38* (2024.01)
*B01J 35/70* (2024.01)
*B01J 35/77* (2024.01)

(52) U.S. Cl.
CPC ................ *B01J 35/70* (2024.01); *B01J 35/77* (2024.01); *B01J 2229/24* (2013.01); *B01J 2229/26* (2013.01); *B01J 2235/10* (2024.01); *B01J 2235/15* (2024.01); *C10G 2300/1003* (2013.01); *C10G 2300/1014* (2013.01)

(58) Field of Classification Search
CPC ............ C10G 2300/1011; C10G 11/05; C10G 2300/1077; B01J 29/084; B01J 29/088; B01J 35/38; B01J 35/70; B01J 35/77; B01J 2229/24; B01J 2229/26; B01J 2235/10; B01J 2235/15; B01J 37/0045; B01J 2229/42; B01J 21/04
USPC ........................................................ 585/241
See application file for complete search history.

(56) References Cited

U.S. PATENT DOCUMENTS

| | | | | |
|---|---|---|---|---|
| 4,458,023 | A | 7/1984 | Welsh et al. | |
| 2011/0113675 | A1 | 5/2011 | Fujiyama et al. | |
| 2013/0131419 | A1 | 5/2013 | Buchanan et al. | |
| 2020/0009541 | A1 | 1/2020 | Zhou et al. | |
| 2020/0338536 | A1 * | 10/2020 | Sabahi | B01J 29/7049 |
| 2021/0170373 | A1 | 6/2021 | Cha et al. | |
| 2021/0178370 | A1 | 6/2021 | Zhou et al. | |
| 2023/0294083 | A1 * | 9/2023 | De Silva | B01J 21/02<br>208/120.01 |

FOREIGN PATENT DOCUMENTS

| | | | |
|---|---|---|---|
| CN | 108452826 | A | 3/2020 |
| CN | 110193376 | A | 9/2021 |
| CN | 110193377 | A | 9/2021 |
| GB | 1315553 | A | 5/1973 |
| JP | H11564 | A | 1/1999 |
| JP | 2002119861 | A | 4/2002 |
| WO | 96/09890 | | 4/1996 |
| WO | 02/098563 | A1 | 12/2002 |
| WO | 06/067154 | A1 | 6/2006 |
| WO | 2018/191647 | A1 | 10/2018 |
| WO | 2019/140249 | A1 | 7/2019 |

OTHER PUBLICATIONS

Sakashita et al. "Nanoporous Al2O3 Designed as Protective Matrix for Zeolite in Catalytic Cracking" Journal of the Japan Petroleum Institute, 2011, 248-257, 54(4).
Al-Khattaf, S., "The Influence of Alumina on the Performance of FCC Catalysts during Hydrotreated VGO Catalytic Cracking", Energy & Fuels, 2003, 62-68, 17.

* cited by examiner

| Zeolite Type | UCS (Å) | Acidity @200°C mmol/g | | Acidity @400°C mmol/g | | Lewis Acidity Retention, % |
|---|---|---|---|---|---|---|
| | | Bronsted Acidity (mmol/g) | Lewis Acidity (mmol/g) | Bronsted Acidity (mmol/g) | Lewis Acidity (mmol/g) | |
| RE-Y-1 | 24.68 | 43.86 | 10.24 | 34.74 | 0.50 | 5% |
| RE-USY-1 | 24.57 | 38.20 | 5.17 | 27.04 | 1.08 | 21% |
| RE-USY-2 | 24.52 | 38.80 | 6.19 | 29.03 | 1.04 | 17% |
| RE-Y-2 | 24.68 | 49.33 | 10.04 | 32.2 | 1.13 | 11% |
| RE-USY-3 | 24.52 | 39.10 | 10.27 | 28.07 | 2.26 | 22% |
| RE-Y-3 | 24.68 | 42.76 | 11.24 | 22.94 | 0.58 | 5% |
| RE-USY-4 | 24.63 | 38.54 | 10.05 | 27.68 | 3.75 | 37% |
| RE-USY-5 | 24.57 | 47.29 | 7.54 | 36.26 | 1.94 | 26% |

| Zeolite Type | UCS (Å) | Acidity, mmol/g | | Acidity, mmol/g | | Total Acidity, mmol/g | Acidity Retention At 400°C |
|---|---|---|---|---|---|---|---|
| | | Below 300°C | Above 300°C | Below 400°C | Above 400°C | | |
| RE-Y-1 | 24.68 | 1.397 | 0.777 | 1.905 | 0.269 | 2.174 | 35% |
| RE-USY-1 | 24.57 | 1.196 | 0.679 | 1.598 | 0.277 | 1.875 | 41% |
| RE-USY-2 | 24.52 | 1.158 | 0.742 | 1.553 | 0.347 | 1.900 | 47% |
| RE-USY-3 | 24.52 | 1.085 | 0.685 | 1.473 | 0.297 | 1.769 | 43% |
| RE-Y-2 | 24.68 | 1.931 | 0.826 | 2.508 | 0.248 | 2.757 | 30% |
| RE-Y-3 | 24.68 | 1.766 | 0.787 | 2.347 | 0.206 | 2.554 | 26% |
| RE-USY-5 | 24.57 | 1.236 | 0.930 | 1.729 | 0.438 | 2.167 | 47% |
| RE-USY-4 | 24.63 | 1.312 | 0.721 | 1.712 | 0.320 | 2.033 | 44% |

FCC CATALYST WITH ULTRASTABLE ZEOLITE AND TRANSITIONAL ALUMINA ITS PREPARATION AND USE

FIELD OF THE INVENTION

The present invention pertains to a catalyst composition and its use in a process for the cracking or conversion of a feed comprised of hydrocarbons, such as, for example, those obtained from the processing of feedstocks, showing an increase in bottoms conversion and an increase in coke selectivity, resulting in less making of coke.

BACKGROUND

A common challenge in the design and production of heterogeneous catalysts is to find a good compromise between the effectiveness and/or accessibility of the active sites and the effectiveness of the immobilizing matrix in giving the catalyst particles sufficient physical strength, i.e. attrition resistance.

The preparation of attrition resistant catalysts is disclosed in several prior art documents. U.S. Pat. No. 4,086,187 discloses a process for the preparation of an attrition resistant catalyst by spray-drying an aqueous slurry prepared by mixing (i) a faujasite zeolite with a sodium content of less than 5 wt % with (ii) kaolin, (iii) peptised pseudoboehmite, and (iv) ammonium polysilicate. The attrition resistant catalysts according to U.S. Pat. No. 4,206,085 are prepared by spray-drying a slurry prepared by mixing two types of acidified pseudoboehmite, zeolite, alumina, clay, and either ammonium polysilicate or silica sol.

GB 1 315 553 discloses the preparation of an attrition resistant hydrocarbon conversion catalyst comprising a zeolite, a clay, and an alumina binder. The catalyst is prepared by first dry mixing the zeolite and the clay, followed by adding an alumina sol. The resulting mixture is then mixed to a plastic consistency, which requires about 20 minutes of mixing time. In order to form shaped particles, the plastic consistency is either pelletised or extruded, or it is mixed with water and subsequently spray-dried. The alumina sol disclosed in this British patent specification comprises aluminium hydroxide and aluminium trichloride in a molar ratio of 4.5 to 7.0 (also called aluminium chlorohydrol).

U.S. Pat. No. 4,458,023 relates to a similar preparation procedure, which is followed by calcination of the spray-dried particles. During calcination, the aluminium chlorohydrol component is converted into an alumina binder. WO 96/09890 discloses a process for the preparation of attrition resistant fluid catalytic cracking catalysts. This process involves the mixing of an aluminium sulphate/silica sol, a clay slurry, a zeolite slurry, and an alumina slurry, followed by spray-drying. During this process, an acid- or alkaline-stable surfactant is added to the silica sol, the clay slurry, the zeolite slurry, the alumina slurry and/or the spray-drying slurry. CN 1247885 also relates to the preparation of a spray-dried cracking catalyst. This preparation uses a slurry comprising an aluminous sol, pseudoboehmite, a molecular sieve, clay, and an inorganic acid. In this process the aluminous sol is added to the slurry before the clay and the inorganic acid are added, and the molecular sieve slurry is added after the inorganic acid has been added. According to one embodiment, pseudoboehmite and aluminium sol are first mixed, followed by addition of the inorganic acid. After acidification, the molecular sieve is added, followed by kaolin.

WO 02/098563 discloses a process for the preparation of an FCC catalyst having both a high attrition resistance and a high accessibility. The catalyst is prepared by slurrying zeolite, clay, and boehmite, feeding the slurry to a shaping apparatus, and shaping the mixture to form particles, characterised in that just before the shaping step the mixture is destabilised. This destabilisation is achieved by, e.g., temperature increase, pH increase, pH decrease, or addition of gel-inducing agents such as salts, phosphates, sulphates, and (partially) gelled silica. Before destabilisation, any peptizable compounds present in the slurry must have been well peptised.

WO 06/067154 describes an FCC catalyst, its preparation and its use. It discloses a process for the preparation of an FCC catalyst having both a high attrition resistance and a high accessibility. The catalyst is prepared by slurrying a clay, zeolite, a sodium-free silica source, quasi-crystalline boehmite, and micro-crystalline boehmite, provided that the slurry does not comprise peptized quasi-crystalline boehmite, b) adding a monovalent acid to the slurry, c) adjusting the pH of the slurry to a value above 3, and d) shaping the slurry to form particles.

BRIEF DESCRIPTION OF THE INVENTION

Figure 1:
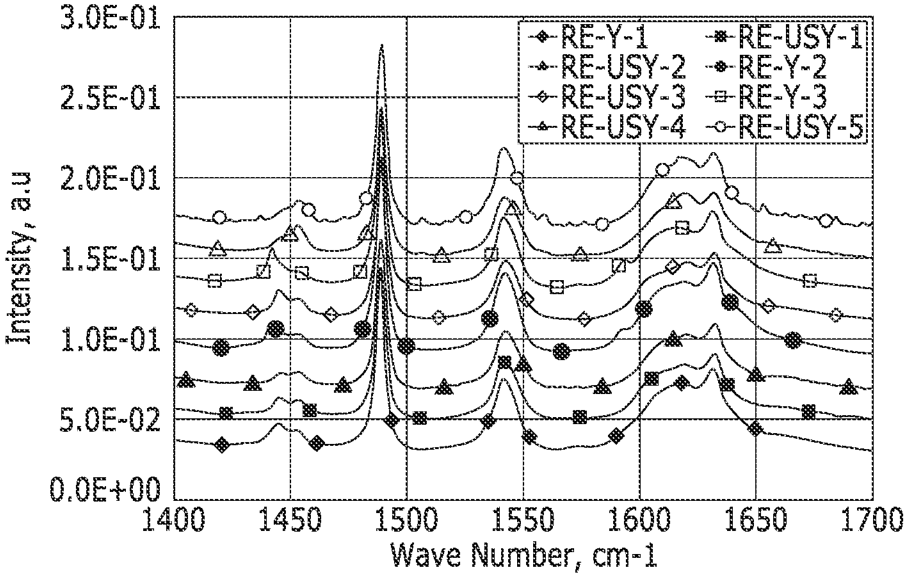
FIG. 1 is a graph and table showing the pyridine adsorbed FT-IR profiles of RE-Y and RE-USY zeolites at 200° C. and acidity of RE-Y and RE-USY zeolites measured by pyridine adsorbed FT-IR spectroscopy.

The present invention relates to an FCC catalyst meant to be employed in the process for cracking, a hydrocarbon or hydrocarbon blend feed over a particular catalyst composition to produce conversion product hydrocarbon compounds of lower molecular weight than feed hydrocarbons, e.g., product comprising a high gasoline fraction. A unique feature of the invention is the use of gamma alumina and/or alumina containing chi phase or gibbsite phase alumina and/or combinations thereof in addition to other aluminas.

Thus, in one embodiment, provided an FCC catalyst composition comprising of ultra-stabilize Y zeolite (USY zeolite) with total Lewis acidity retention of at least above 15% when increasing the adsorption temperature from 200 to 400° C. in pyridine adsorbed FT-IR and at least above 35% retention in total acidity when increasing the desorption temperature from 300 to 400° C. in ammonia Temperature Programmed Desorption (TPD) measurement and at least two different alumina types wherein at least one alumina is a dispersible binding alumina sol and the other alumina is of a transitional alumina phase with XRD peaks at about 37.6 (311), 45.8 (400) and 67 (440) 2-theta (referred herein as gamma alumina) or alumina containing metastable phase with characteristics XRD peaks of 2 values of 37, 43, and 67 degrees (referred herein as alumina with chi phase) or non-peptizable gibbsite-alumina has the characteristics XRD peaks of 2θ values of 18, 20.3 and 38 degrees (referred herein as gibbsite alumina). Further, the total amount of with chi or gamma or gibbsite phase is greater than 0 wt % to about 30 wt %.

The resulting catalyst shows improved benefits over that known in the art. For example, the improved catalyst exhibits improved bottoms conversion.

In a still further embodiment, provided is a process for cracking a petroleum fraction feedstock said process comprising the steps of:

a) providing an FCC catalyst composition comprising of USY zeolite with total Lewis acidity retention of at least above 15% when increasing the adsorption temperature from 200 to 400 C in pyridine adsorbed FT-IR and at least above 35% retention in total acidity when increasing the desorption temperature from 300 to 400 C in ammonia TPD measurement and at least two different alumina types wherein at least one alumina is a dispersible binding alumina sol and the other alumina is of a transitional alumina phase with XRD peaks at about 37.6 (311), 45.8 (400) and 67 (440) 2-theta or alumina with metastable phase with characteristics XRD peaks of 2θ values of 37, 43, and 67 degrees or non-peptizable gibbsite-alumina has the characteristics XRD peaks of 2θ values of 18, 20.3 and 38 degrees;
b) contacting the FCC catalyst with said petroleum fraction feedstock or a blend of >0 wt % of vegetable oils (soya bean, canola, corn, palm, rape seed, etc.), waste oils, tallow, and/or pyrolysis oil derived by any thermal treatment of biomass or plastics and combinations thereof at a temperature in the range of from 400 to 650° C., with a dwell time in the range of from 0.5 to 12 seconds.

These and still other embodiments, advantages and features of the present invention shall become further apparent from the following detailed description, including the appended claims.

DETAILED DESCRIPTION OF THE INVENTION

Unless otherwise indicated, weight percent (1-10 wt %) as used herein is the dry base weight percent of the specified form of the substance, based upon the total dry base weight of the product for which the specified substance or form of substance is a constituent or component. It should further be understood that, when describing steps or components or elements as being preferred in some manner herein, they are preferred as of the initial date of this disclosure, and that such preference(s) could of course vary depending upon a given circumstance or future development in the art.

General Procedure

Typically, the first step of the process of manufacturing the improved catalyst is to mix clay sources, with silica, and one or more alumina (boehmite) sources, including gamma alumina. The clay, zeolite, quasi-crystalline bochmites (QCBs), micro-crystalline boehmites (MCBs), gamma alumina, chi alumina, gibbsite alumina, and silica, and optional other components such as rare earth components can be slurried by adding them to water as dry solids. Alternatively, slurries containing the individual materials are mixed to form the slurry accordingly. It is also possible to add some of the materials as slurries, and others as dry solids. Optionally, other components may be added, such as aluminium chlorohydrol, aluminium nitrate, $Al_2O_3$, $Al(OH)_3$, anionic clays (e.g. hydrotalcite), smectites, sepiolite, barium titanate, calcium titanate, calcium-silicates, magnesium-silicates, magnesium titanate, mixed metal oxides, layered hydroxy salts, additional zeolites, magnesium oxide, bases or salts, and/or metal additives such as compounds containing an alkaline earth metal (for instance Mg, Ca, and Ba), a Group IIIA transition metal, a Group IVA transition metal (e.g. Ti, Zr), a Group VA transition metal (e.g. V, Nb), a Group VIA transition metal (e.g. Cr, Mo, W), a Group VIIA transition metal (e.g. Mn), a Group VIIIA transition metal (e.g. Fe, Co, Ni, Ru, Rh, Pd, Pt), a Group IB transition metal (e.g. Cu), a Group IIB transition metal (e.g. Zn), a lanthanide (e.g. La, Ce), or mixtures thereof. Any order of addition of these compounds may be used. It is also possible to combine these compounds all at the same time.

The term "boehmite" is used in the industry to describe alumina hydrates which exhibit X-ray diffraction (XRD) patterns close to that of aluminium oxide-hydroxide [AlO(OH)]. Further, the term boehmite is generally used to describe a wide range of alumina hydrates which contain different amounts of water of hydration, have different surface areas, pore volumes, specific densities, and exhibit different thermal characteristics upon thermal treatment. Yet their XRD patterns, although they exhibit the characteristic boehmite [AlO(OH)] peaks, usually vary in their widths and can also shift in their location. The sharpness of the XRD peaks and their location has been used to indicate the degree of crystallinity, crystal size, and amount of imperfections.

Broadly, there are two categories of boehmite aluminas: quasi-crystalline boehmites (QCBs) and micro-crystalline boehmites (MCBs). In the state of the art, quasi-crystalline boehmites are also referred to as pseudo-boehmites and gelatinous boehmites. Usually, these QCBs have higher surface areas, larger pores and pore volumes, and lower specific densities than MCBs. They disperse easily in water or acids, have smaller crystal sizes than MCBs, and contain a larger number of water molecules of hydration. The extent of hydration of QCB can have a wide range of values, for example from about 1.4 up to about 2 moles of water per mole of Al, intercalated usually orderly or otherwise between the octahedral layers. Some typical commercially available QCBs are Pural®, Catapal®, and Versal® products.

Microcrystalline boehmites are distinguished from the QCBs by their high degree of crystallinity, relatively large crystal size, very low surface areas, and high densities. Contrary to QCBs, MCBs show XRD patterns with higher peak intensities and very narrow half-widths. This is due to their relatively small number of intercalated water molecules, large crystal sizes, the higher degree of crystallization of the bulk material, and the smaller amount of crystal imperfections. Typically, the number of water molecules intercalated can vary in the range from about 1 up to about 1.4 per mole of Al. A typical commercially available MCB is Condea's P-200®.

MCBs and QCBs are characterized by powder X-ray reflections. The ICDD contains entries for boehmite and confirms that reflections corresponding to the (020), (021), and (041) planes would be present. For copper radiation, such reflections would appear at 14, 28, and 38 degrees 2-theta. The exact position of the reflections depends on the extent of crystallinity and the amount of water intercalated: as the amount of intercalated water increases, the (020) reflection moves to lower values, corresponding to greater d-spacings. Nevertheless, lines close to the above positions would be indicative of the presence of one or more types of boehmite phases. For the purpose of this specification, we define quasi-crystalline boehmites as having a (020) reflection with a full width at half height (FWHH) of 1.5° or greater than 1.5° 2θ. Boehmites having a (020) reflection with a FWHH of smaller than 1.5° 2θ are considered micro-crystalline boehmites. The slurry preferably comprises about 1 to about 50 wt %, more preferably about 15 to about 35 wt %, of non-peptised QCB based on the final catalyst. The slurry also comprises about 1 to about 50 wt %, more preferably about 0 to about 35 wt % of MCB based on the final catalyst.

A unique aspect of the present application is the combination of an FCC catalyst and a third source of alumina. The third alumina of the present inventions is a non-peptizable alumina containing gamma phase or non-peptizable alumina containing chi phase or non-peptizable gibbsite phase alumina and/or combinations thereof. The present invention contains about 1 to about 30 wt % non-peptizable alumina comprising gamma or chi or gibbsite phase alumina.

Gamma alumina is understood to be a transitional phase of alumina. Boehmite or pseudoboehmite can be converted to gamma alumina through the application of a heat treatment. Typically, boehmite or pseudoboehmite is treated at 500-800° C. (preferably at about 600° C.-800° C.) for a period of about 1 to about 4 hours. The gamma alumina phase is exhibited by XRD peaks at about 37.6 (311), 45.8 (400) and 67 (440) 2-theta. For purposes of the present invention, it is preferred to utilize gamma alumina with small crystallite size. Specifically, it is preferred to utilize gamma alumina with crystallite size less than about 20 nm. It is more preferred to utilize gamma alumina with crystallite size less than about 10 nm. Furthermore, because gamma alumina is non-binding, it is preferred to utilize gamma alumina with small particle size. The smaller size (<5.0 microns) will insure that there will be minimal impact on the physical properties of the catalyst while still seeing the advantages of the gamma alumina. The total amount of gamma alumina is greater than 0 wt % to about 30 wt % based on the final catalyst Chi is a metastable phase of alumina and is non-peptizable. It has the characteristics XRD peaks of 2 θ values of 37, 43, and 67 degrees. It can be obtained from thermal treatment of gibbsite alumina at moderate temperature (300-700° C.) ranges. Chi is introduced to the slurry as an alumina containing chi phase component. And typically, the alumina containing Chi phase component comprises about 1-25% Chi phase alumina.

Gibbsite is one of the mineral forms of aluminium hydroxide and is an important ore of aluminium in that it is one of three main phases that make up the rock bauxite. The basic structure forms stacked sheets of linked octahedra. Each octahedron is composed of an aluminium ion bonded to six hydroxide groups, and each hydroxide group is shared by two aluminium octahedral. The non-peptizable gibbsite-alumina has the characteristics XRD peaks of 2θ values of 18, 20.3 and 38 degrees. The total amount of gibbsite alumina is greater than 0 wt % to about 30 wt % based on the final catalyst.

The total amount of silica added is greater than 0 to about 25 wt %. The source of silica is typically a low sodium silica source, acidic or ammonia stabilized silicas and is added to the initial slurry. Examples of such silica sources include, but are not limited to potassium silicate, sodium silicate, lithium silicate, calcium silicate, magnesium silicate, ammonium silicate, barium silicate, strontium silicate, zinc silicate, phosphorus silicate, and barium silicate. Examples of suitable organic silicates are silicones (polyorganosiloxanes such as polymethylphenyl-siloxane and polydimethylsiloxane) and other compounds containing Si—O—C—O—Si structures, and precursors thereof such as methyl chlorosilane, dimethyl chlorosilane, trimethyl chlorosilane, and mixtures thereof. Preferred low sodium silica sources are sodium stabilized basic colloidal silicas or acid or ammonia stabilized colloidal silicas.

Also the clay is preferred to have a low sodium content, or to be sodium-free. Suitable clays include kaolin, bentonite, saponite, sepiolite, attapulgite, laponite, halloysite, hectorite, English clay, anionic clays such as hydrotalcite, and heat- or chemically treated clays such as meta-kaolin. The slurry preferably comprises about 5 to about 70 wt %, more preferably about 10 to about 60 wt %, and most preferably about 10 to about 50 wt % of clay.

In a next step, a monovalent acid is added to the suspension, causing digestion. Both organic and inorganic monovalent acids can be used, or a mixture thereof. Examples of suitable monovalent acids are formic acid, acetic acid, propionic acid, methyl sulfonic acid nitric acid, and hydrochloric acid. The acid is added to the slurry in an amount sufficient to obtain a pH lower than 7, more preferably between 1 and 4.

One or more zeolites are added at any point, but preferably after the addition of the monovalent acid. The zeolites used in the process according to the present invention preferably has a low sodium content (less than 1.5 wt % $Na_2O$), or is sodium-free. Suitable zeolites to be present in the slurry of step a) include zeolites such as Y-zeolites-including HY, USY, dealuminated Y, RE-Y, and RE-USY-zeolite beta, ZSM-5, phosphorus-activated ZSM-5, ion-exchanged ZSM-5, MCM-22, and MCM-36, metal-exchanged zeolites, ITQs, SAPOs, ALPOs, and mixtures thereof. The slurry preferably comprises 20 to 60 wt % of one or more zeolite based on the final catalyst.

In addition, optionally, a rare earth component is added in an amount of about 0.1 to about 10 wt %, based on the oxide form, in the form of a salt or solution to the mixture. Examples of suitable rare earth elements include but not limited to lanthanum, yttrium and cerium. The rare earth is typically added as hydroxide, chloride, oxide, nitrate, sulfate, oxychlorides, acetates, or carbonates. Preferably, lanthanum nitrate and/or yttrium nitrate is added in an amount of about 0.1 to about 10 wt % based on the oxide form in the form of a salt or solution. The rare earth component can be added before or after the peptization (or digestion) of the alumina as described above.

Another unique aspect of the present invention is the presence of Ultra-stabilized Y Zeolite. In particular, the USY zeolite with total Lewis acidity retention of at least above 15% when increasing the adsorption temperature from 200 to 400 C in pyridine adsorbed FT-IR and at least above 35% retention in total acidity when increasing the desorption temperature from 300 to 400 C in ammonia TPD measurement. USY are characterized in that they have controlled acidity and acid site density with improved/increased mesoporosity compared to non-USY zeolites. The increased mesoporosity in USY improves the diffusivity of heavier hydrocarbon molecules into the zeolite pores and enhance their interactions with the acid sites in the zeolite structure. Also, the controlled acid sites density in USY help to selectively crack these heavier molecules, resulting less coke deposition in the pores, extending the stability of the zeolite compared to microporous non-USY zeolite in FCC catalysts. There are different ways to increase the mesoporosity of Y zeolite and modify the acidity. The more classical method for mesopore creation in Y zeolite is steam-calcination at elevated temperatures that involves removal of Al from the lattice creating a vacant site (dealumination) and the migration of silicon species to the vacant site stabilizes the zeolite framework and creates mesopores. The silicon migration increases the framework SiO2/Al2O3 ratio, resulting reduced acid site density compared to non-USY zeolite. The extend of mesopore creation and acid sites density reduction can be controlled by the severity of steam-calcination/dealumination.

The above slurry is then passed through a high sheer mixer where it is destabilized by increasing the pH. The pH of the slurry is subsequently adjusted to a value above 3, more preferably above 3.5, even more preferably above 4. The pH of the slurry is preferably not higher than 7, because slurries with a higher pH can be difficult to handle. The pH can be adjusted by adding a base (e.g. NaOH or $NH_4OH$) to the slurry. The time period between the pH adjustment and shaping step d) preferably is 30 minutes or less, more preferably less than 5 minutes, and most preferably less than 3 minutes. At this step, the solids content of the slurry preferably is about 10 to about 45 wt %, more preferably about 15 to about 40 wt %, and most preferably about 20 to about 35 wt %.

The slurry is then shaped. Suitable shaping methods include spray-drying, pulse drying, pelletising, extrusion (optionally combined with kneading), beading, or any other conventional shaping method used in the catalyst and absorbent fields or combinations thereof. A preferred shaping method is spray-drying. If the catalyst is shaped by spray-drying, the inlet temperature of the spray-dryer preferably ranges from 300 to 600° C. and the outlet temperature preferably ranges from 105 to 200° C.

The Resulting Catalyst

The catalyst so obtained has exceptionally good attrition resistance and accessibility. Therefore, the invention also relates to a catalyst obtainable by the process according to the invention. The catalyst is generally an FCC catalyst composition comprising of USY zeolite with total Lewis acidity retention of at least above 15% when increasing the adsorption temperature from 200 to 400° C. in pyridine adsorbed FT-IR and at least above 35% retention in total acidity when increasing the desorption temperature from 300 to 400° C. in ammonia TPD measurement and at least two different alumina types wherein at least one alumina is a dispersible binding alumina sol and wherein the other alumina is of a transitional alumina phase with XRD peaks at about 37.6 (311), 45.8 (400) and 67 (440) 2-theta and/or metastable phase alumina with characteristics XRD peaks of $2\theta$ values of 37, 43, and 67 degrees or gibbsite-alumina with characteristics XRD peaks of $2\theta$ values of 18, 20.3 and 38 degrees. Further, the resulting catalyst may comprise about 20 to about 60 wt % one or more zeolites, about 15 to about 35 wt % quasicrystalline boehmite as the dispersible binding alumina, about 0 to about 35 wt % microcrystalline boehmite, greater than 0 wt % to about 25 wt % silica, optionally rare earth component and the balance clay.

These catalysts can be used as FCC catalysts or FCC additives in hydroprocessing catalysts, alkylation catalysts, reforming catalysts, gas-to-liquid conversion catalysts, coal conversion catalysts, hydrogen manufacturing catalysts, and automotive catalysts. The invention therefore also relates to the use of these catalyst obtainable by the process of the invention as catalyst or additive in fluid catalytic cracking, hydroprocessing, alkylation, reforming, gas-to-liquid conversion, coal conversion, and hydrogen manufacturing, and as automotive catalyst.

The process of the invention is particularly applicable to Fluid Catalytic Cracking (FCC). In the FCC process, the details of which are generally known, the catalyst, which is generally present as a fine particulate comprising over 90 wt % of the particles having diameters in the range of about 5 to about 300 microns. In the reactor portion, a hydrocarbon feedstock is gasified and directed upward through a reaction zone, such that the particulate catalyst is entrained and fluidized in the hydrocarbon feedstock stream. The hot catalyst, which is coming from the regenerator, reacts with the hydrocarbon feed which is vaporized and cracked by the catalyst. Typically temperatures in the reactor are 400-650 C and the pressure can be reduced, under atmospheric or superatmospheric pressure, usually about atmospheric to about 5 atmospheres. The catalytic process can be either fixed bed, moving bed, or fluidized bed, and the hydrocarbon flow may be either concurrent or countercurrent to the catalyst flow. The process of the invention is also suitable for TCC (Thermofor catalytic cracking) or DCC (Deep Catalytic Cracking). In addition, the hydrocarbon feedstock may include a blend of >0 wt % of vegetable oils (soya bean, canola, corn, palm, rape seed, etc.), waste oils, tallow, and/or pyrolysis oil derived by any thermal treatment of biomass or plastics and combinations thereof.

EXAMPLES

Prior to any lab testing the catalyst must be deactivated to simulate catalyst in a refinery unit, this is typically done with steam. These samples were deactivated either by cyclic deactivation with Ni/V which consists of cracking, stripping and regeneration steps in the presence of steam or with 100% steam at higher temperatures, which are industrially accepted deactivation methods for FCC catalysts. The deactivation step is known in the art, and is necessary to catalytic activity. In commercial FCC setting, deactivation occurs shortly after catalyst introduction, and does not need to be carried out as a separate step.

Accessibility Measurement

The accessibility of the catalysts prepared according to the examples below was measured by adding 1 g of the catalyst to a stirred vessel containing 50 ml vacuum gas oil diluted in toluene. The solution was circulated between the vessel and a spectrophotometer, in which process the VGO-concentration was continuously measured.

Temperature Programmed Desorption of Ammonia (NH3-TPD): The total acidity and strength of acid sites for any catalytic material can be measured by temperature programmed desorption method using ammonia as probe molecule. The amount of ammonia desorbed is indicative of total acidity and desorption temperature is indicative of strength of acid sites. The procedure is very close to ASTM D4824 method for acidity measurement. This is a gravimetric based temperature programmed desorption, whereas the ASTM D4824 is volumetric based method. With this method, the acidity is determined at the surface and in the pores of the sample by measuring the amount of ammonia desorbed during a temperature ramp. The experiment is performed on a Thermal Gravimetric Analyzer (Mettler Toledo TGA). The sample is pre-calcined at 600° C. in air for at least 1 hour. About 50 mg to 100 mg of sample is re-treated by heating in nitrogen at 600° C. for ~30 mins in the TGA instrument and the temperature is cooled down to 100° C. Subsequently, ammonia stream with nitrogen flow is led over the sample for 30-60 mins, to be adsorbed on the acid sites. Then the physically adsorbed ammonia molecules were removed by a flush step in nitrogen at 100° C. for 30-60 mins. The actual temperature programmed desorption takes place afterwards: a temperature ramping up to 600° C. is applied and the weight changes during desorption are monitored. The amount of ammonia desorbed is recorded as the weight change. The quantity of the acid sites is expressed as the amount of ammonia (mmoles) desorbed per gram of dry sample using the weight changes during desorption.

FTIR spectroscopy of pyridine adsorption (Pyridine FT-IR): The total acidity and types of acid sites (Lewis or Bronsted) can be quantified by FTIR spectroscopy using pyridine as probe molecule. The measurement is performed with a FTIR instrument (Thermo Fisher) with a high temperature transmission cell (Specac). The zeolite powder sample was pressed into a self-supported wafer (~15-30 mg with diameter of 13 mm) and the wafer was calcined at 600° C. in air for about 1 hour. Then the sample wafer was transferred to IR cell and re-treated in nitrogen at 500° C.-600° C. for ~15 mins. After cooling the temperature down to 200° C., the pyridine with nitrogen flow passes through the IR cell for 1 hour and then vacuum treated for ~60 mins at the same temperature. A spectrum for the desorption at 200° C. is then recorded with a spectral resolution of 2 cm−1 in the region going from 400 to 3800 cm−1. The spectrum is normally taken at ~100° C. for a better baseline. For the desorption at a higher temperature, the IR cell temperature is ramped to the set temperature, and the IR cell is kept at the temperature under nitrogen flow for 1 hour. The spectrum for the desorption at that temperature is taken after the cell cooling to 100° C. The characteristic absorption bands of Lewis and Bronsted acid sites (1450 and 1545 cm−1, respectively) are integrated. For quantification of Lewis and Bronsted acid sites, the apparent integral absorption coefficients of 2.22 (for Lewis acid sites) and 1.67 (for Bronsted acid sites) are employed for the integrations of the absorption bands at 1450 and 1545 cm−1.

As described in the previous section, the Bronsted and Lewis acidity of the USY and regular Y zeolites were measured by pyridine adsorbed FT-IR spectroscopy and the profiles are shown in the figure below. The peak at 1545 $cm^{-1}$ represents the Bronsted acid sites, whereas the peak at 1455 $cm^{-1}$ for Lewis acid sites. The area under each peak is considered as amount of acid sites. Both regular RE-Y and RE-USY with different UCS showed similar FT-IR profiles, but varies in the total acidity significantly. See FIG. 1.

Both Bronsted and Lewis acid sites were quantified at 200 and 400° C. and the values are listed in the table in FIG. 1. It is interesting to note that all the USY zeolites have higher Lewis acid site retention when increasing the desorption temperature from 200 to 400° C. compared to regular RE-Y zeolites. The USY zeolite have above 15% retention on Lewis acid sites when increasing the desorption temperature from 200 to 400° C., whereas the regular Y zeolites have below 15% retention in Lewis acid sites. Since USY zeolites have high framework SiO2/Al2O3 ratio due to possible silicon insertion, stronger Lewis acid sites are created. These strong Lewis acid sites may have positive impact in the hydrocarbon cracking reactions, particularly on cracking heavier molecules.

Similarly, the acidity profiles of these zeolites were measured by temperature programmed desorption method using ammonia as probe molecule as described in the previous sections. Generally, the desorption below 300° C. is considered as ammonia desorbed from weak and medium strength acid sites, whereas desorption above 300° C. is considered from stronger acid sites. See FIG. 2.

Figure 2:
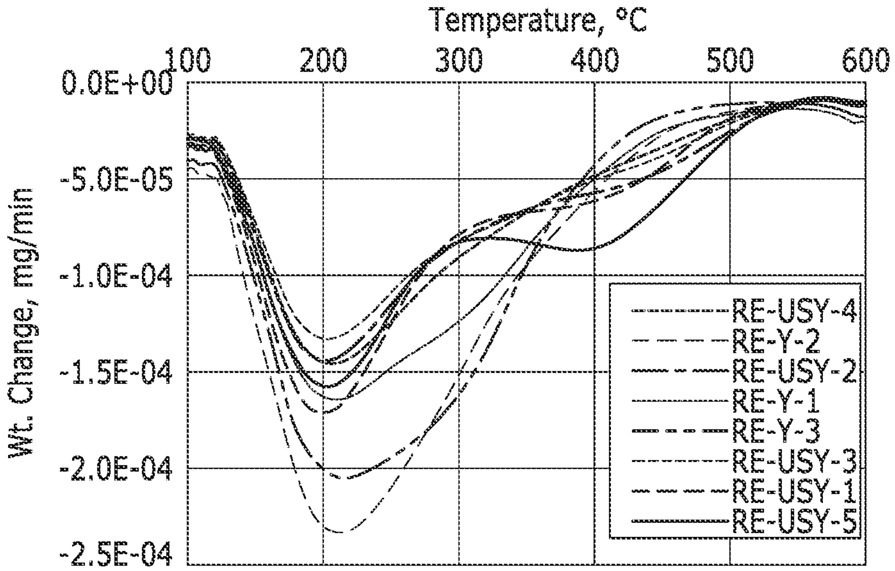
FIG. 2 is a graph and table showing acidity profiles of RE-Y and RE-USY zeolites measured by temperature programmed desorption method using ammonia as probe molecule and ammonia TPD profiles of RE-Y and RE-USY zeolites of different UCS and RE levels.

The acidity data provided in the table in FIG. 2 for both low and high temperature regions for USY and non-USY zeolites indicates that the USY zeolites have at least 40% retention at 400° C. compared to 300° C. The non-USY zeolites are lower in the acidity retention indicating that stronger acid sites in USY zeolites may have some impact in the hydrocarbon cracking reactions.

Example 1

Table 1 below describes the comparison of FCC catalyst made only with RE-Y zeolite (non-USY) as reference catalyst along with catalysts made with USY with UCS of 24.52 Å and transitional phase (Gamma) alumina at two different levels. All other active components including total RE2O3 were equal in this comparison. These catalysts were deactivated with Ni and V by industrially practiced cyclic deactivation method and their performance was evaluated in ACE using a resid feed oil. As shown in the table below, the catalysts made with USY and gamma alumina showed improved bottoms upgrading compared to reference catalyst made only with RE-Y zeolite.

TABLE 1

| Catalyst Description | Reference-1 | Exp-1 | Exp-2 |
|---|---|---|---|
| Quasi-crystalline alumina | 31.0 | 31.0 | 31.0 |
| Micro-crystalline alumina | 18.0 | 18.0 | 18.0 |
| Colloidal silica | 1.5 | 1.5 | 1.5 |
| RE-Y-1 | 26.0 | | |
| RE-USY-2 | | 24.70 | 24.70 |
| Gamma alumina | | 5.00 | 10.0 |
| RE component | | 1.32 | 1.32 |
| Clay | 23.50 | 19.80 | 14.80 |
| | ACE performance data | | |
| 430° F.+ Conversion, wt % | 75.76 | 73.67 | 74.18 |
| Catalyst-to-Oil, wt/wt | 5.00 | 5.00 | 5.00 |
| | Selectivity at constant conversion, % | | |
| 430° F.+ Conversion, wt % | 74.00 | 74.00 | 74.00 |
| Catalyst-to-Oil, wt/wt | 4.18 | 5.13 | 4.92 |
| YIELDS, WT %: | | | |
| Coke | 7.13 | 7.46 | 7.34 |
| Dry Gas | 4.29 | 3.00 | 3.01 |
| Propylene | 5.11 | 5.02 | 5.10 |
| C4 Olefins | 7.10 | 7.23 | 7.30 |
| Gasoline (C5-430° F.) | 46.08 | 47.41 | 47.29 |
| LCO (430-650° F.) | 16.68 | 17.17 | 17.16 |
| 650° F.+ | 9.32 | 8.83 | 8.84 |
| LPG | 16.51 | 16.12 | 16.36 |
| C3=/C3s | 0.842 | 0.856 | 0.851 |
| C4=/C4s | 0.680 | 0.705 | 0.704 |
| LCO/Bottoms | 1.79 | 1.95 | 1.94 |

Example—2

Table 2 below, USY with UCS 24.57 Å along with an alumina containing about 7% Chi phase was compared to reference catalyst made only withy RE-Y zeolite. Similar to previous example, these catalysts were deactivated and tested in ACE with resid feed oil. Again the catalyst with USY and Chi phase alumina showed improved bottoms cracking compared to reference catalyst.

TABLE 2

| Catalyst Description | Reference 2 | Exp-3 |
|---|---|---|
| Quasi-crystalline alumina | 31.0 | 31.0 |
| Micro-crystalline alumina | 18.0 | 18.0 |
| Colloidal silica | 1.5 | 1.5 |
| RE-Y | 26.0 | |
| RE-USY-5 | | 25.2 |
| Alumina containing 7% Chi phase | | 5.00 |
| RE component | | 0.80 |
| Kaolin | 23.50 | 18.50 |
| | ACE performance data | |

TABLE 2-continued

| Catalyst Description | Reference 2 | Exp-3 |
|---|---|---|
| 430° F.+ Conversion, wt % | 80.32 | 80.09 |
| Catalyst-to-Oil, wt/wt | 5.00 | 5.00 |
| | Selectivity at constant conversion, % | |
| 430° F.+ Conversion, wt % | 79.00 | 79.00 |
| Catalyst-to-Oil, wt/wt | 3.91 | 4.26 |
| YIELDS, WT %: | | |
| Coke | 7.67 | 8.47 |
| Dry Gas | 3.11 | 3.12 |
| Propylene | 5.37 | 5.27 |
| C4 Olefins | 7.18 | 7.23 |
| Gasoline (C5-430° F.) | 50.49 | 50.06 |
| LCO (430-650° F.) | 14.60 | 14.71 |
| 650° F.+ | 6.40 | 6.29 |
| LPG | 17.73 | 17.35 |
| C3=/C3s | 0.831 | 0.837 |
| C4=/C4s | 0.638 | 0.653 |
| LCO/Bottoms | 2.28 | 2.34 |

Example—3

In Table 3 below, catalyst made with RE-USY with UCS 24.57 Å and transitional alumina (gamma phase) was compared to catalyst made with RE-Y. Again, the performance benefits of catalyst with USY and gamma alumina is clearly seen, particularly in bottoms upgrading ability.

TABLE 3

| Catalyst Description | Reference-3 | Exp-4 |
|---|---|---|
| Quasi-crystalline alumina | 30.6 | 30.6 |
| Micro-crystalline alumina | 18.0 | 18.0 |
| Colloidal silica | 1.5 | 1.5 |
| RE-Y-1 | 26.0 | |
| RE-USY-5 | | 26.00 |
| Gamma alumina | | 5.00 |
| RE component | | 0.90 |
| Clay | 23.50 | 19.80 |
| | ACE performance data | |
| 430° F. + Conversion, wt % | 80.58 | 80.22 |
| Catalyst-to-Oil, wt/wt | 5.00 | 5.00 |
| | Selectivity at constant conversion, % | |
| 430° F. + Conversion, wt % | 79.00 | 79.00 |
| Catalyst-to-Oil, wt/wt | 3.99 | 4.03 |
| YIELDS, WT %: | | |
| Coke | 7.05 | 7.10 |
| Dry Gas | 4.19 | 4.17 |
| Propylene | 13.77 | 13.53 |
| C4 Olefins | 11.20 | 11.06 |
| Gasoline (C5-430° F.) | 34.45 | 35.18 |
| LCO (430-650° F.) | 13.75 | 14.12 |
| 650° F.+ | 7.25 | 6.88 |
| LPG | 33.32 | 32.56 |
| C3=/C3s | 0.853 | 0.854 |
| C4=/C4s | 0.652 | 0.662 |
| LCO/Bottoms | 1.90 | 2.05 |

The invention claimed is:

1. An FCC catalyst composition comprising of USY or RE-USY zeolite with total Lewis acidity retention of at least above 15% when increasing the adsorption temperature from 200° C. to 400° C. in pyridine adsorbed FT-IR and at least above 35% retention in total acidity when increasing the desorption temperature from 300 to 400° C. in ammonia TPD measurements and at least two different alumina types wherein at least one alumina is a dispersible binding alumina sol and the second alumina is of a transitional alumina phase with XRD peaks at about 37.6 (311), 45.8 (400) and 67 (440) 2-theta and/or a alumina containing metastable phase with characteristics XRD peaks of 2θ values of 37, 43, and 67 degrees or non-peptizable gibbsite alumina with XRD characteristic peaks of 2θ values 18, 20.3 and 38 degrees.

2. The FCC catalyst composition of claim 1 wherein the dispersible binding alumina is a quasicrystalline boehmite in an amount of about 15 to about 35 wt %, and wherein the FCC catalyst composition further comprises about 20 to about 60 wt % one or more zeolites, about 0 to about 35 wt % microcrystalline boehmite, greater than 0 wt % to about 25 wt % silica, and the balance clay.

3. The FCC catalyst composition of claim 1 comprising at least two different alumina types wherein at least one alumina is a dispersible binding alumina sol and wherein at least one alumina is of a transitional alumina phase with XRD peaks at about 37.6 (311), 45.8 (400) and 67 (440) 2-theta.

4. The FCC catalyst composition of claim 1 comprising at least two different alumina types wherein at least one alumina is a dispersible binding alumina sol and wherein at least one alumina is a metastable Chi phase of alumina with characteristics XRD peaks of 2θ values of 37, 43, and 67 degrees.

5. The FCC catalyst of claim 1 wherein the transitional alumina phase is gamma alumina or gibbsite.

6. The FCC catalyst of claim 3 wherein the transitional alumina has crystallite size less than about 20 nm.

7. The FCC catalyst of claim 4 wherein the transitional alumina has crystallite size less than about 10 nm.

8. The FCC catalyst of claim 1 wherein the transitional alumina is prepared by heat treating the alumina of the dispersible binding alumina sol.

9. The FCC Catalyst of claim 1 wherein the transitional alumina is prepared by heat treating quasicrystalline boehmite.

10. The FCC Catalyst of claim 3 wherein an amount of Chi phase alumina is greater than 0 wt % to about 10 wt %.

11. The FCC Catalyst of claim 1 wherein the amount of transitional alumina is greater than 0 wt % to about 30 wt %.

12. The FCC catalyst of claim 1 wherein the total alumina is greater than about 35 wt %.

13. A process for producing more liquid components from a feedstock, said process comprising the steps of:

providing an FCC catalyst composition of claim 1;

b. contacting the FCC catalyst composition with a feedstock, at one or more temperatures in the range of about 400 to about 650° C., with a dwell time in the range of about 0.5 to about 12 seconds.

14. The process of claim 13 wherein the feedstock is a hydrocarbon feedstock.

15. The process of claim 14 wherein the feedstock is a blend of hydrocarbons and vegetable oils, waste oils, tallow, or pyrolysis oil derived by any thermal treatment of biomass or plastics, and any combinations thereof.

* * * * *